United States Patent
Schick et al.

(10) Patent No.: US 6,988,351 B2
(45) Date of Patent: Jan. 24, 2006

(54) MIDMOUNT MOWER APPARATUS WITH RAISEABLE AND ACCESSIBLE MOWER DECK

(75) Inventors: Scott A. Schick, Corydon, IA (US); Charles C. Shivvers, Corydon, IA (US); Steve D. Shivvers, Prole, IA (US)

(73) Assignee: Shivvers Group, Inc., Corydon, IA (US)

( * ) Notice: Subject to any disclaimer, the term of this patent is extended or adjusted under 35 U.S.C. 154(b) by 0 days.

(21) Appl. No.: 10/223,391

(22) Filed: Aug. 19, 2002

(65) Prior Publication Data

US 2002/0194826 A1 Dec. 26, 2002

Related U.S. Application Data

(63) Continuation-in-part of application No. 09/192,025, filed on Nov. 13, 1998, now Pat. No. 6,434,919.

(51) Int. Cl.
A01D 34/64 (2006.01)

(52) U.S. Cl. .................................. 56/15.9; 56/DIG. 22

(58) Field of Classification Search ................ 56/14.7, 56/15.1, 15.2, 15.9, 16.7, 17.1, 320.1, 320.2, 56/DIG. 22
See application file for complete search history.

(56) References Cited

U.S. PATENT DOCUMENTS

| | | | |
|---|---|---|---|
| 3,852,945 A * | 12/1974 | Berry et al. ................... 56/12.7 |
| 3,874,150 A | 4/1975 | Boeck | |
| 4,250,696 A * | 2/1981 | Hash ........................... 56/14.7 |
| 4,364,438 A * | 12/1982 | Pyle ............................ 172/789 |
| 4,779,406 A | 10/1988 | Schroeder | |
| 5,079,907 A | 1/1992 | Sameshima et al. | |
| 5,341,629 A * | 8/1994 | Penner ......................... 56/15.2 |
| 5,355,665 A | 10/1994 | Peter | |
| 5,410,865 A | 5/1995 | Kurohara et al. | |
| 5,459,984 A | 10/1995 | Reichen et al. | |
| 5,475,971 A | 12/1995 | Good et al. | |
| 5,784,870 A | 7/1998 | Seegert et al. | |
| 5,816,033 A | 10/1998 | Busboom et al. | |
| 5,816,035 A | 10/1998 | Schick | |
| 5,915,487 A | 6/1999 | Splittstoesser et al. | |
| 5,927,055 A | 7/1999 | Ferree et al. | |
| 5,946,893 A * | 9/1999 | Gordon ........................ 56/15.8 |
| 6,012,274 A | 1/2000 | Eavenson et al. | |
| 6,023,921 A | 2/2000 | Burns et al. | |
| 6,341,480 B1 * | 1/2002 | Dahl et al. .................... 56/15.9 |
| 6,393,815 B1 * | 5/2002 | Funk et al. ................... 56/320.2 |
| 6,516,597 B1 * | 2/2003 | Samejima et al. ............ 56/16.7 |
| 6,530,200 B1 * | 3/2003 | Minoura et al. .............. 56/17.1 |

OTHER PUBLICATIONS

Brochure Bob-Cat® ZT 200 Series, by Ransomes Bob-Cat.
Brochure Country Clipper® Zero Turn Mowers, by Shivvers, Mfg.

(Continued)

Primary Examiner—Victor Batson
(74) Attorney, Agent, or Firm—John C. McMahon

(57) ABSTRACT

A self-propelled mower includes a frame and a mower housing mounted underbelly relative to the frame by a mounting assembly. The mounting assembly allows the mower housing to be disconnected from the frame and swung near the front of the housing from a mowing configuration to an access configuration as a front end of the mower is raised. In one embodiment the frame includes a yoke that receives a nose of the housing, as the front of the mower is raised. A mechanized drive is utilized in certain embodiments to swing the mower deck to the access configuration.

4 Claims, 13 Drawing Sheets

OTHER PUBLICATIONS

Brochure Country Clipper® Flip Up Deck, by Shivvers Mfg.
Brochure Z48, by Encore.
Brochure ZTR 5000 Series, by Dixon.
Brochure Exmark Lazer A® HP, by Exmark.
Brochure Pro Cut Z's, by Ferris Industries, Inc.
Brochure ZT MAX®, by F.D. Kees Manufacturing Co.
Brochure Snapper Yard Cruiser®, by Snapper.
Brochure TWISTER BZT Zero-Turning-Radius Riding Mower, by Bunton, Division of Jacobsen.
Brochure Great Dane® "Zero Turn Chariot", by Great Dane Power Equipment, Inc.
Brochure PROWLER, by Encore Power Equipment.
Brochure MTD Pro MNZ wide-area mower, by MTDpro.
Brochure IS® First-With Independent Suspension, by Ferris Industries.

* cited by examiner

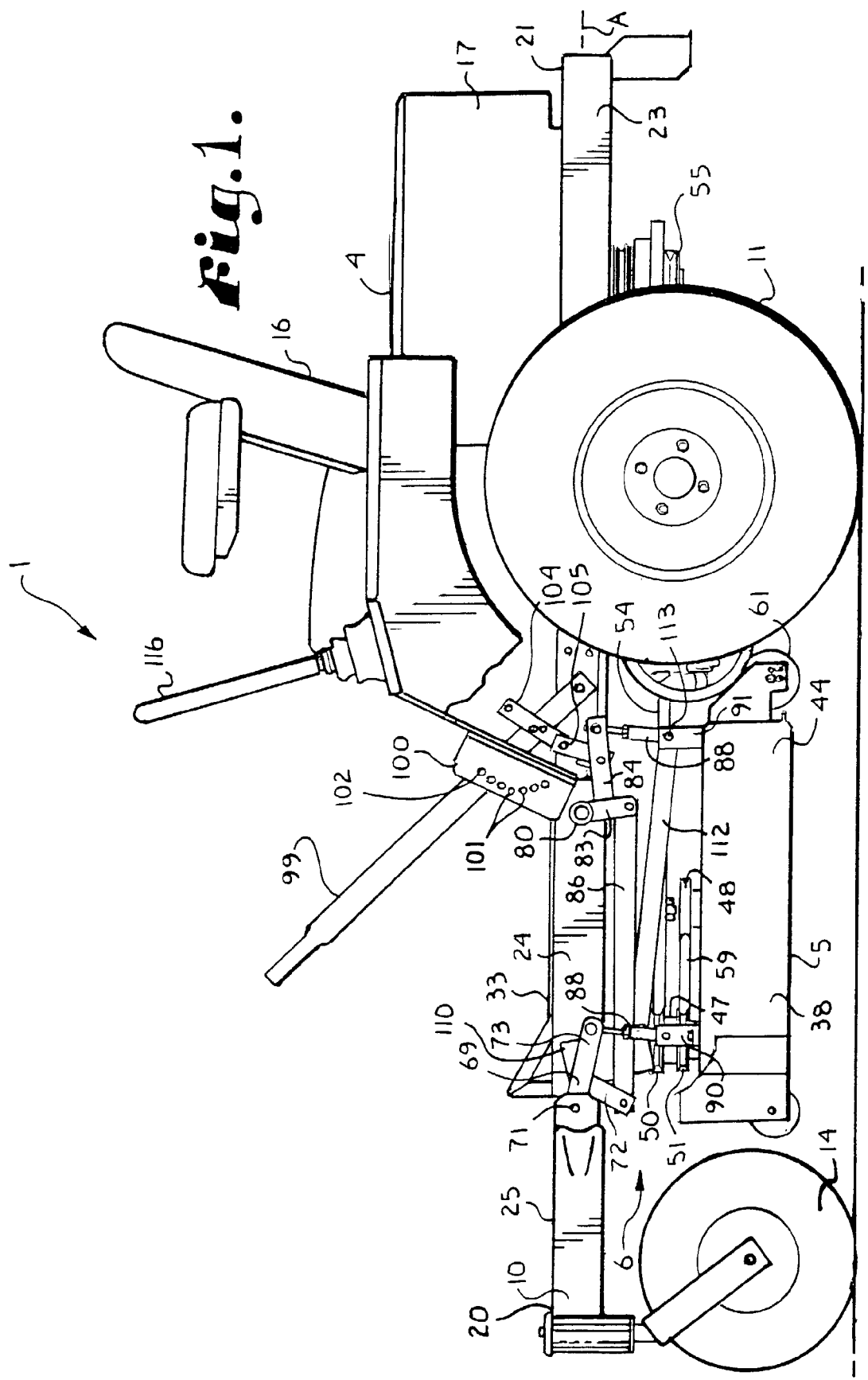

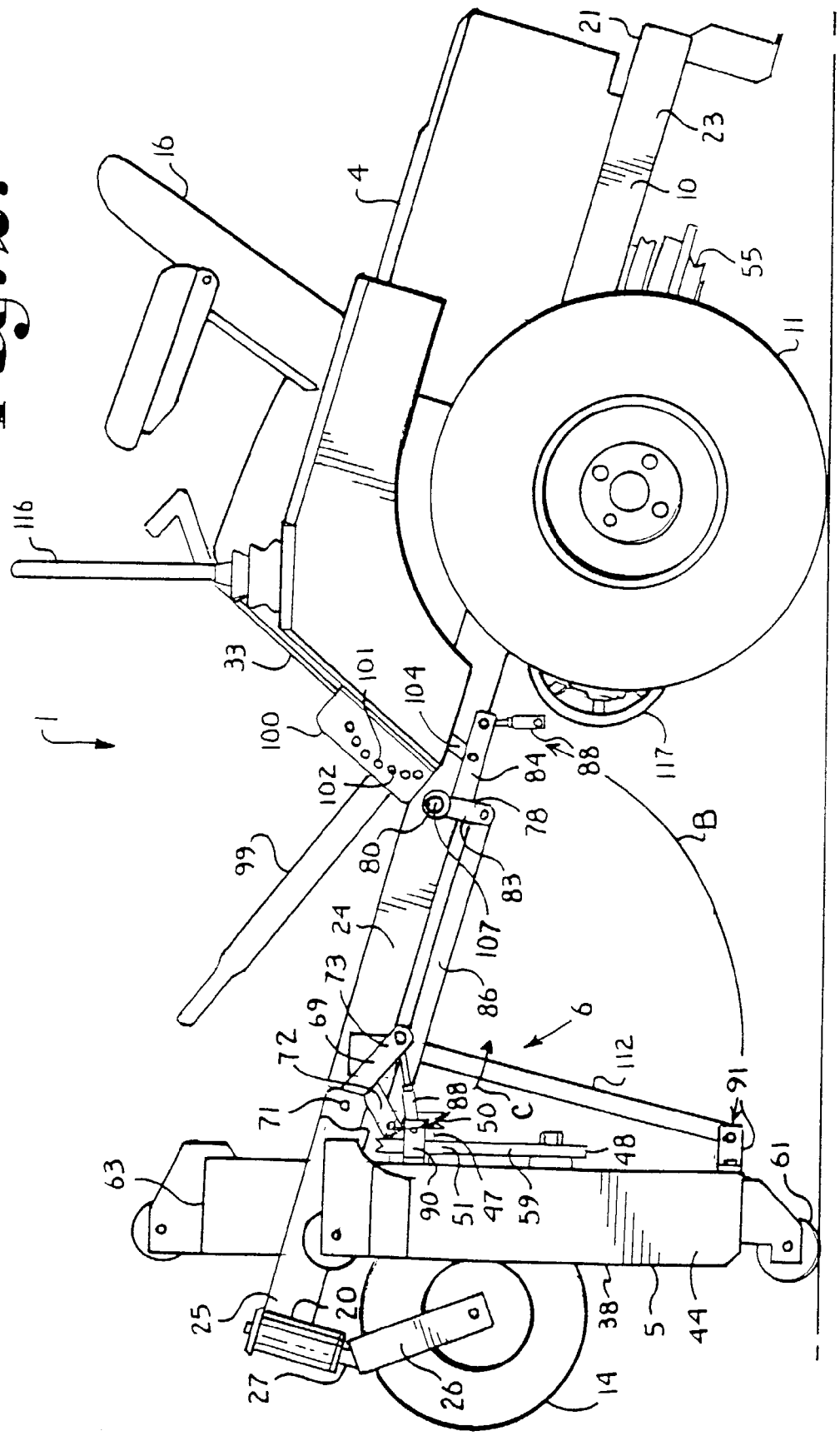

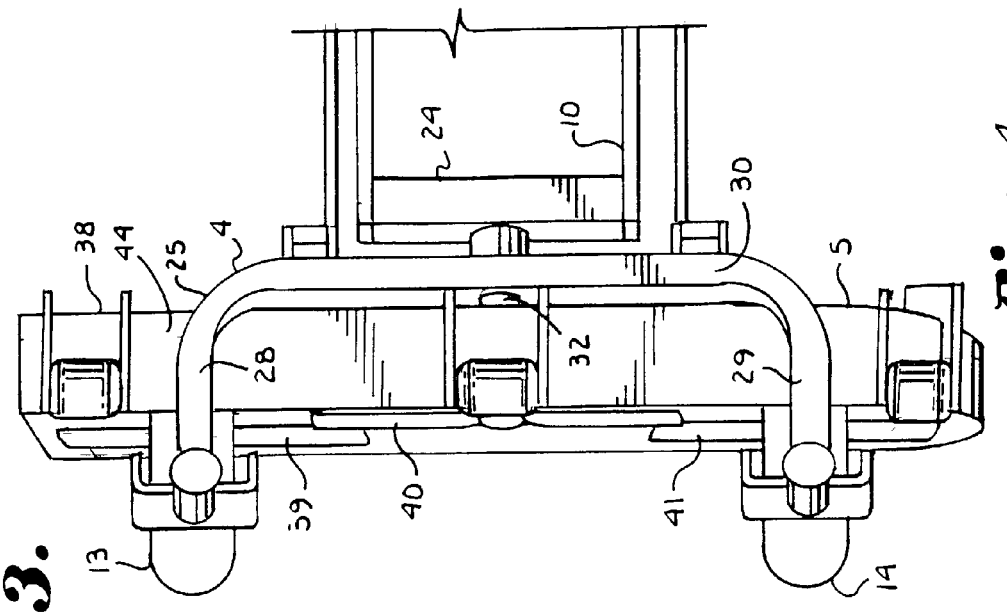
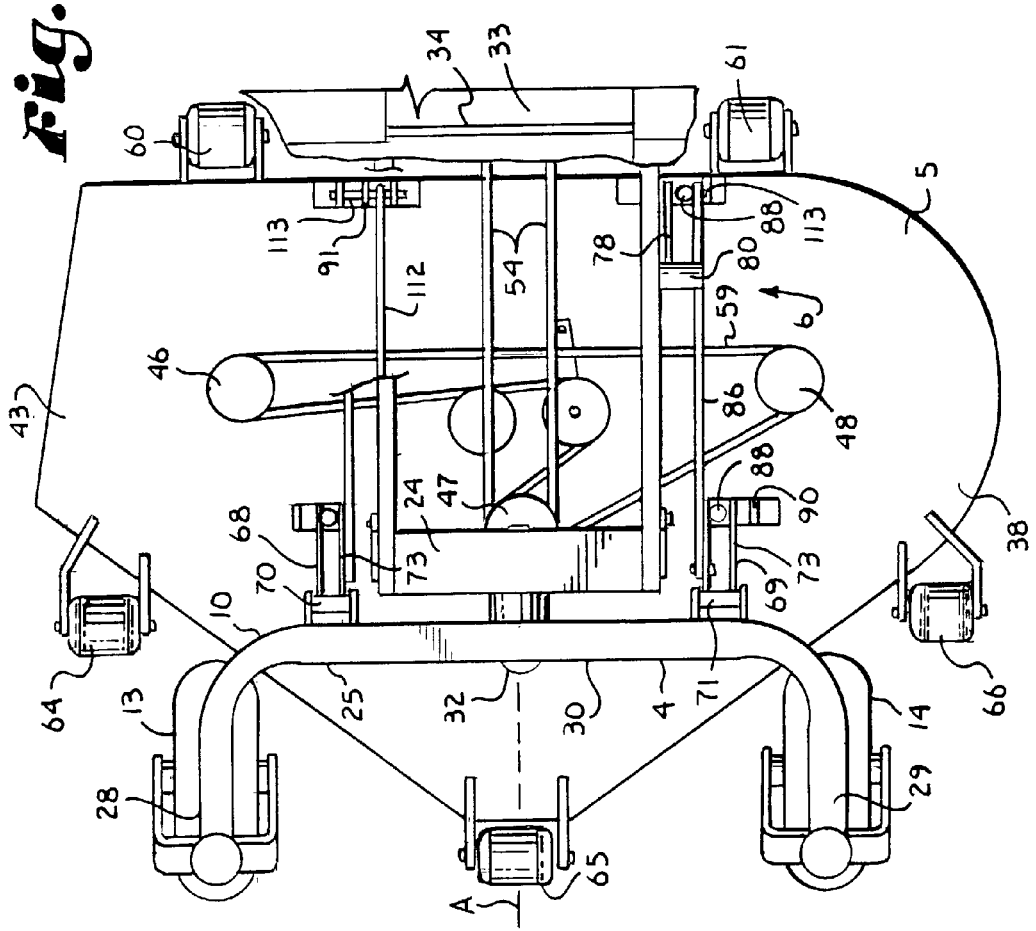

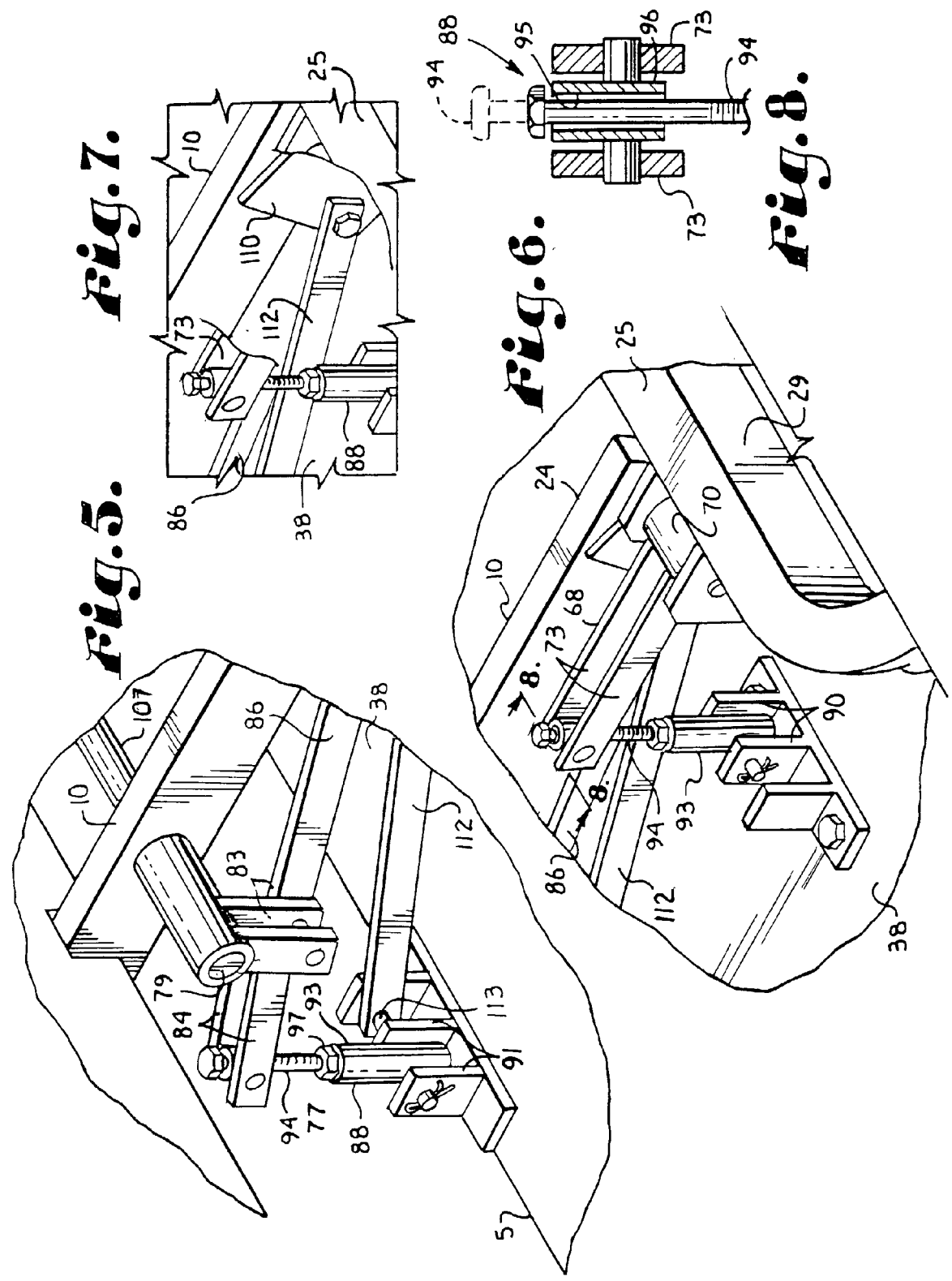

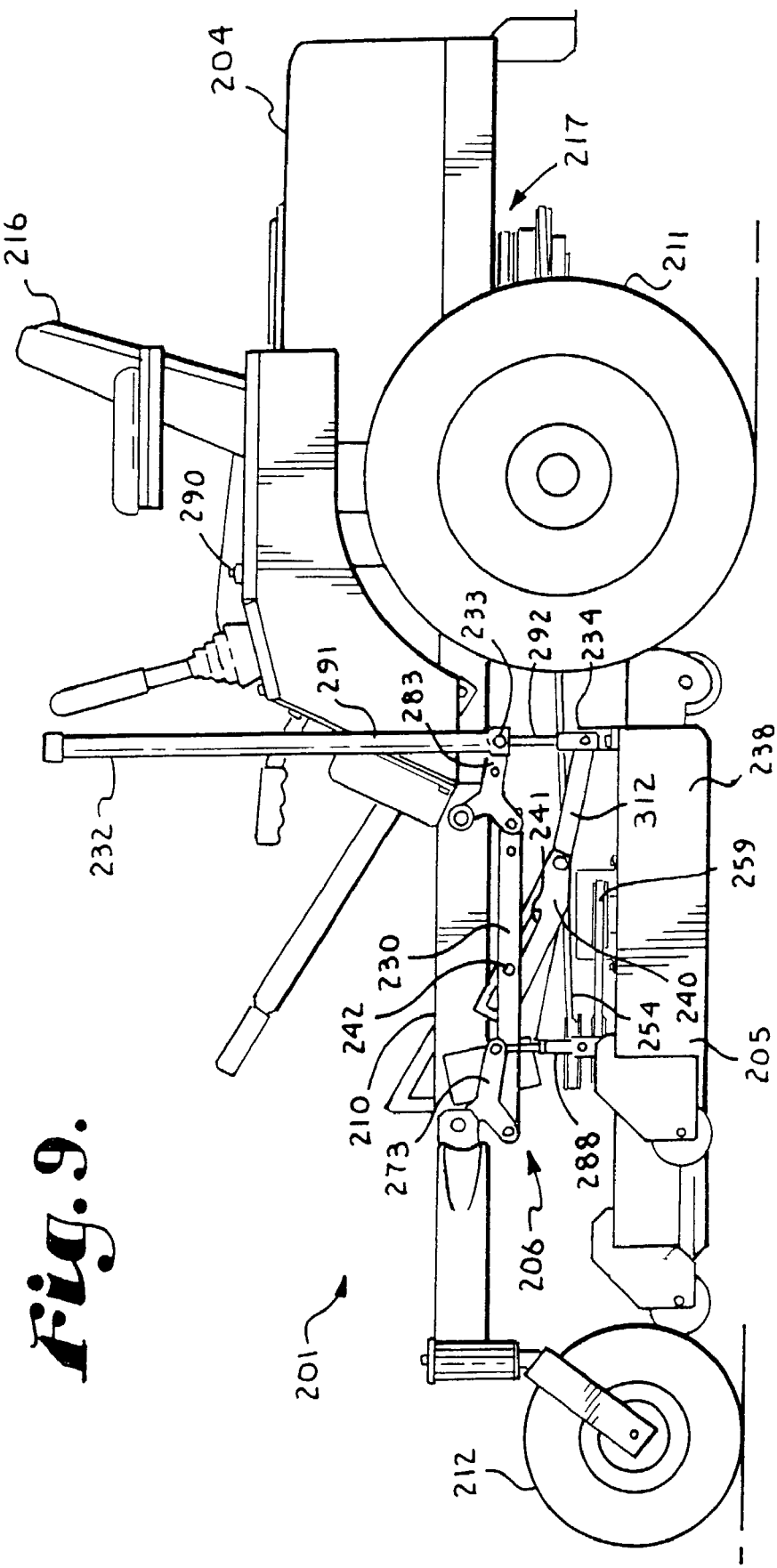

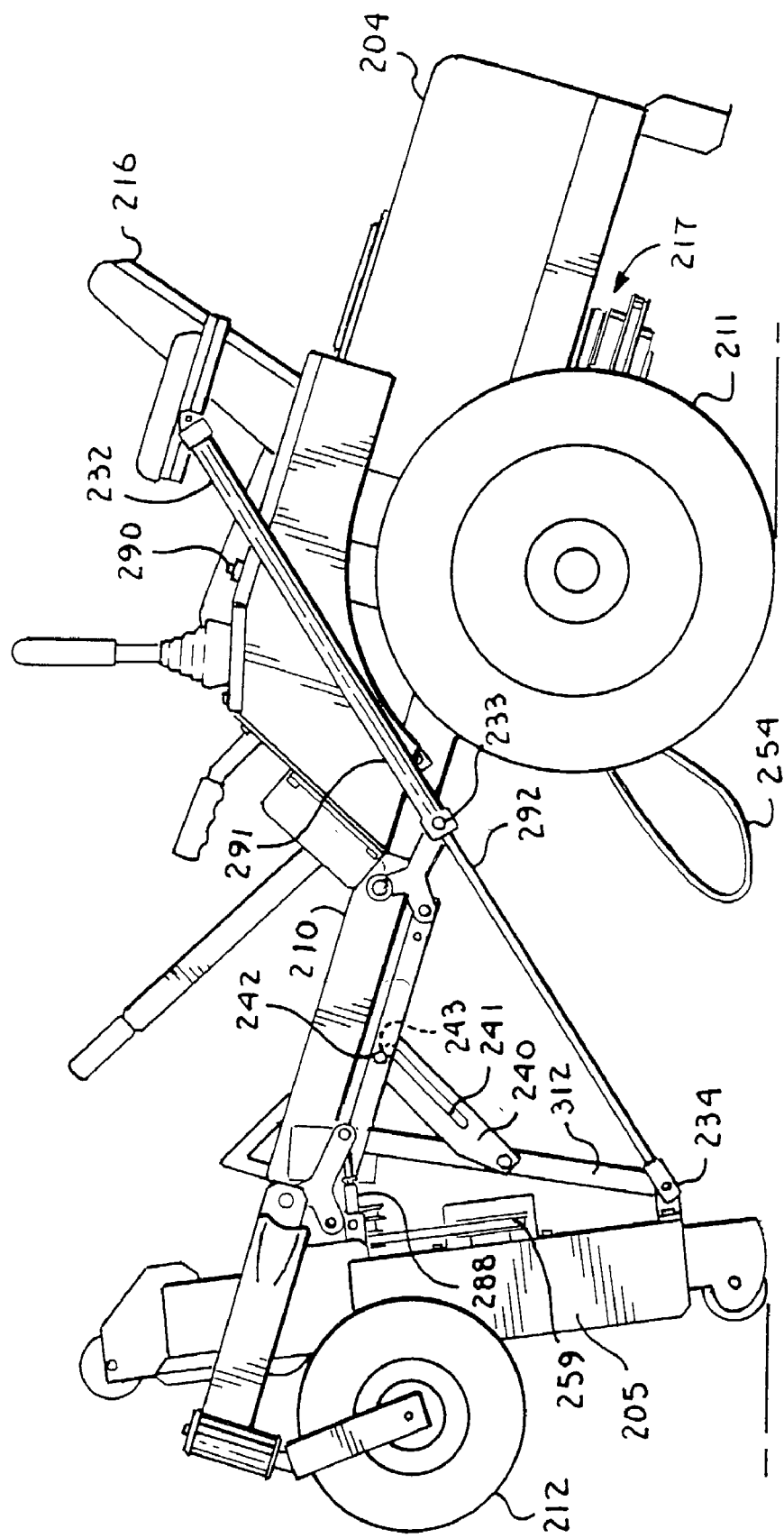

MIDMOUNT MOWER APPARATUS WITH RAISEABLE AND ACCESSIBLE MOWER DECK

CROSS REFERENCE TO RELATED APPLICATION

The following application is a Continuation-in-Part of U.S. Ser. No. 09/192,025, filed Nov. 13, 1998 and entitled RAISEABLE MOWER DECK, now U.S. Pat. No. 6,434,919.

BACKGROUND OF THE INVENTION

The present invention is directed to an underbelly or mid-mount mower for use in conjunction with a tractor and which is easily moveable between a mowing position and a blade accessible position that allows a user to easily perform mechanical work on the underside of the mower.

Self propelled mowers are generally either of the self-contained type where a mower is mounted directly on a tractor or the trail-behind type in which the mower is pulled by a tractor. Of the self-contained type, the mower is normally of two types which are forward deck mounted or underbelly mounted. Each type has its benefits and associated problems. Historically, one of the problems with the underbelly type is that, because the mower is mounted beneath the tractor, it is very difficult to get to the underside of the mower, especially the cutting blades, for repairs and the like without substantial disassembly of the mower.

In prior art underbelly mowers, an operator has often had to raise the tractor off the ground as they would a car, utilizing jacks, ramps or the like to the point where the underside of the mower is sufficiently raised for the operator to get under it with the blades generally in a horizontal plane, or the operator may raise the front end of the tractor as a unit until the tractor rests on its rear, where the blades are in a vertical plane, but the whole mower is also vertical. It is also common to have to completely disassemble the mower unit and remove it, in order to perform even minor repairs such as changing blades, cleaning or the like. None of these methods have worked very satisfactorily. Work on the mower is especially a problem when the operator is in the field and does not have independent jacks and other heavy tools to assist the operator. Commercial mower operators, who often must access the underside of the mower at least twice a day, often to change cutting blades, find such underbelly or mid mount mowers to be especially troublesome.

Therefore, it was found to be desirable to have a mower that provides the benefits of an underbelly mower, yet is relatively easy to convert to an accessible configuration by an unassisted operator. Furthermore, it was desired to provide such a mower that does not require cumbersome separate jacking or lifting equipment and that can easily be converted to the accessible configuration on the job by a single operator. Further, when the mower is raised, it is best to have the mower swing into a vertical rather than try to work on the mower a horizontal configuration, so that the operator does not have to crawl under the mower to work upon it. It is also desirable to provide an accessible configuration wherein the mower is stable.

In some embodiments it is also desirable to provide the operator with a mechanized assist apparatus that helps place the mower blades in a vertical plane wherein the assist apparatus mechanically rotates and raises portions of the device. Such assist apparatus includes electrically or hydraulically powered devices such as linear screws, hydraulic cylinders and the like or hand operated screws. As the tractor can include a frame that medially pivots under control of such an assist apparatus to reduce the required lifting as may be solid and require some raising to rotate a mowing deck to an access position thereof. When the frame pivots, an over center spring is preferentially used to urge the frame to both the access position of the mower and to the use position thereof. It is also preferable for the mower blades to be accessible without having to disassemble the drive belt.

Further, the mower deck must be adjustable in height. In many instances, this requires suspending the deck from the frame of the tractor with a complex mounting mechanism. Because the suspension of the deck undesirably allows the deck to swing backward during use, drag links are sometimes used to properly position the deck. However, drag links present additional problems to an already complex mounting system and it is desirable in some instances to provide pushes that mount on the frame and push the deck, but do not interfere with raising or lowering the deck.

SUMMARY OF THE INVENTION

The present invention provides a mower having a mobile tractor with a frame and an underbelly mower assembly deck or housing that is mounted beneath the frame. The mower housing is connected to the frame by a mounting assembly that allows an operator to adjust height of the overall mower assembly, to finely adjust the mowing height of one corner of the mower housing relative to other corners, and to transfer ground traversing driving force from the tractor to the mower housing. In certain embodiments, the mounting assembly also allows the mower housing to be easily and quickly partially disconnected from the frame such that the mower housing can rotate at the rear thereof from a mowing configuration to a blade access configuration. In other embodiments, the mower housing can be rotated without requiring the disconnection of hangers.

In order for the housing to be able to rotate, in certain embodiments the front or nose of the mower housing is shaped and configured to be received in a yoke associated with the frame. After the front of the mower is raised and the housing rotates to the access configuration, the nose also mates with the yoke in an over center configuration while an operator works on the underside of the housing.

In certain embodiments the mounting assembly includes a set of four hangers to hang each corner of the housing from the frame. In these embodiments the rear hangers are easily disconnected such that in conjunction with removal of a main drive belt, the housing is free to swing. Also in certain embodiments, the housing is connected to the frame by drag links on either side of the housing that transfer propulsion to the mower housing from the tractor. The drag links are configured, sized and shaped in conjunction with the front hangers to allow the housing to swing relative to the frame without binding.

In one embodiment of this invention the mower housing is joined to the frame near the rear of the housing by a mechanized drive that is powered by the mower tractor and selectively urges the mower housing to a raised position thereof once the drive belt is disconnected. Preferably, the drive is an electrically operated screw that extends and contracts under control of the operator and that is powered by electricity from the tractor. It is foreseen that such a screw may also be manually operated.

In yet another embodiment, a portion of the front of the frame is pivotally connected to the rear of the frame and can be pivoted from a lockable position where the connected mower housing is in a mowing configuration to an access configuration. The rear of the mower housing is joined to a rear of the frame by a hydraulic cylinder that is positioned to urge the mower housing to the raised configuration thereof when elongated. In this embodiment the drive belt is located and positioned to bend about a support rod as the deck is raised so that the drive belt does not have to be disconnected as the mower housing is raised. The hydraulic cylinder also functions as a pusher to maintain the correct position of the mower deck relative to the frame while allowing the deck to raise and lower as necessary.

In another embodiment a front of the frame is pivotally attached to the mower housing and to the remainder of the frame and the frame is held in a mowing position by a locking pin. Lifting on the front of the frame when the front and rear are not locked together, raises the mower housing to the raised configuration. An over center spring that swings to sides of the shaft upon which the frame sections pivot helps to raise the mower housing to the raised configuration and also helps return the mower housing to the mowing configuration. Preferably, the drive belt is positioned so that it remains connected during raising.

In yet another embodiment, the front of the frame and mower housing are pivotal relative to each other by operation of a power hydraulic cylinder that utilizes a hydraulic system associated with the tracker to raise the mower housing to the raised configuration. In this embodiment, the drive belt is positioned so as to remain connected during rotation of the mower deck. Also in this embodiment, rather than the mower housing being pulled by drag bars, a rear frame mounted pusher urges the mower housing forward by abutting or engaging the housing at the rear thereof when in the mowing configuration; while allowing the mower housing to be freely raised and lowered.

OBJECTS AND ADVANTAGES OF THE INVENTION

Therefore the objects of the present invention are: to provide a mower including a self propelled tractor and a mower assembly mounted in a mid mount position under a frame of the tractor; to provide such a mower wherein the mower assembly is easily converted between a mowing configuration and an access configuration wherein the underside of the mower is accessible to an operator with the blades in an upright or near vertical plane for repair and the like; to provide such a mower that does not require separate jacks or other lifting equipment in order for the mower to be placed in the access configuration and that provides for rotation of the mower assembly relative to the tractor; to provide such a mower wherein the mower apparatus is swingable to the raised or access configuration by manual lifting of the front of the tractor and held in the access configuration by an over center relationship between the tractor and the mower apparatus or alternatively by operation of a powered mechanical device, such as a tractor powered and mechanized screw or hydraulic cylinder; to provide such a mower wherein the mower apparatus is height adjustable from a driver's seat; to provide such a mower wherein the mower apparatus is pulled by a strap or link located on each side of the mower and wherein rear hangers are easily disconnected to allow the mower apparatus to rotate to the access configuration relative to the tractor; to provide such a mower wherein the tractor has a frame that allows a portion of the mower apparatus to rotate through the frame when moving to the access configuration; to provide an embodiment of such a mower wherein the frame is hinged to allow for easier raising of the mower deck; to provide such a mower with a hinged frame that includes an over center spring to urge the mower assembly to both the access configuration and the mowing configuration thereof; to provide such a mower with a hinged frame that allows raising of the mower deck without disconnecting of a drive belt; and to provide such a mower that is relatively inexpensive to produce, simple to operate and especially well adapted for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a side elevational view of a mower according to the present invention, showing a mower assembly thereof in a mowing configuration thereof.

FIG. 2 is a side elevational view of the mower with the mower assembly shown in an access configuration thereof.

FIG. 3 is a fragmentary and enlarged top plan view of the mower with the mowing assembly in the mowing configuration.

FIG. 4 is a fragmentary and enlarged top plan view of the mower with the mowing assembly in the access configuration.

FIG. 5 is a fragmentary and enlarged perspective view of the mower showing one side of a rear portion of a mounting assembly for the mower assembly.

FIG. 6 is a fragmentary and enlarged perspective view of the mower showing one side of a front portion of the mounting assembly for the mower assembly.

FIG. 7 is a view similar to FIG. 6 with portions broken away to show detail thereof.

FIG. 8 is an enlarged and fragmentary cross-sectional view of a hanger of the mower, taken along line 8—8 of FIG. 6.

FIG. 9 is a side elevational view of a first modified mower according to the present invention with a mower housing thereof in a mowing configuration.

FIG. 10 is a side view of the first modified mower with a mower housing thereof in a raised configuration.

DETAILED DESCRIPTION OF THE INVENTION

Figure 11:
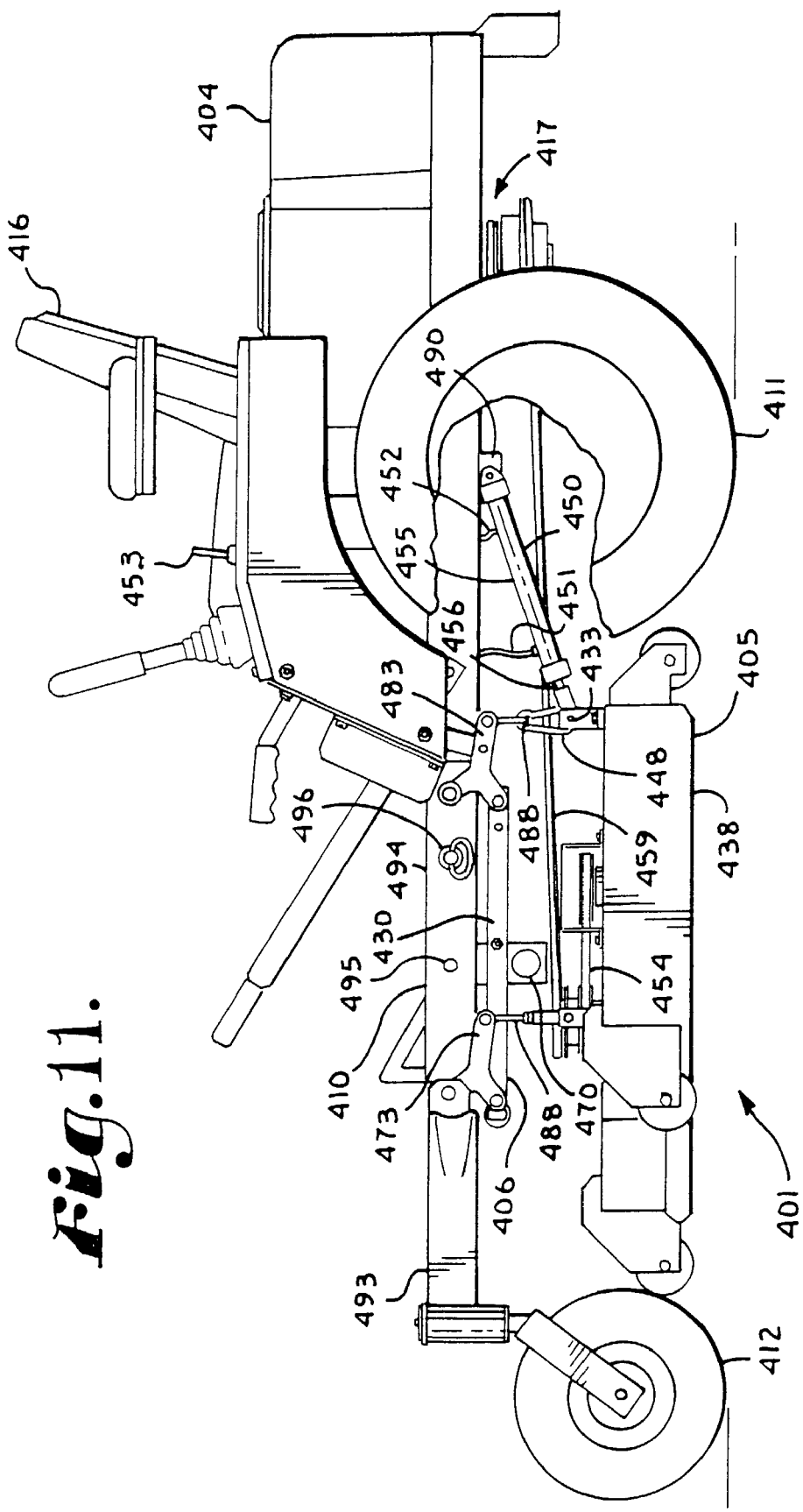
FIG. 11 is a side elevational view of a second modified mower according to the present invention in a mowing configuration.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates an underbelly mower apparatus in accordance with the present invention. The mower 1 comprises a mobile, self-propelled tractor 4, a mower assembly 5 and a mounting assembly 6.

The tractor 4 includes a tractor or vehicle frame 10 supported on a pair of independently driven rear wheels 11 and 12 and a pair of front wheels 13 and 14. Supported on the frame 10 is an operator's seat 16 and a gasoline engine 17. As can be seen from FIG. 1, most of the bulk of the structure supported by the frame 10, and the weight associated therewith is positioned behind or over the rear wheels 11 and 12. While a particular tractor 4 has been illustrated with the present invention, tractors having different configurations will function with the invention provided swingable requirements noted below are met.

The frame 10 has a central elongate axis A extending from a front 20 to a rear 21 of the frame 10. As the frame 10 is raised in the front 20, it is desirable that the rear 21 remain clear of the ground, as seen in FIG. 2. The frame 10 has a rectangular rear section 23 supporting the engine 17 and seat 16 and a rectangular middle section 24 (FIG. 2) rigidly fixed to the rear section 23. The frame 10 further includes a forward yoke 25. The front wheels 13 and 14 are each respectively pivotally mounted by a caster clevis 26 and a pivot pin 27 on the distal ends of opposite arms 28 and 29 of the yoke 25 that are in turn joined by a laterally extending cross-member 30 forming a large U-shaped configuration.

The cross-member 30 is centrally pivotally connected to the middle section 24 by a pivot pin 32 that allows the forward yoke 25 to pivot about the axis A relative to the rest of the frame 10 and thereby allows the front wheels 13 and 14 to follow terrain independent of the rear wheels 11 and 12.

A foot plate 33 is pivotally connected to the frame 10 near the rear of the rectangular middle section 24 by a hinge 34 (FIG. 3). The foot plate 33 has a lowered position (FIG. 1) whereby the plate 33 is adapted to support the feet of an operator and a raised position (FIG. 2) so as to allow easy access to the top of the mower assembly 5.

The mower assembly 5 includes an open bottom deck or housing 38 surrounding three mower blades 39, 40 and 41 (FIG. 4). The housing 38 includes a top plate 43 and a sidewall 44 depending from the periphery of the top plate 43. Each of the blades 39, 40 and 41 is pivotally mounted in the top plate 43 by bearings and have attached thereto a respective drive pulley 46, 47 and 48. The middle drive pulley 47 includes two separate pulley sections 50 and 51 (FIG. 1). The upper pulley section 50 is operably joined by a conventional V-shaped and flexible drive belt 54 (FIG. 3) to a pulley 55 on the engine 17, so as to operably drive the blades 39, 40 and 41 when the pulley 55 is engaged. A transmission (not shown) between the engine pulley 55 and the engine 17 allows an operator to selectively simultaneously engage the blades 39, 40 and 41 through a control (not shown).

A second drive belt 59 is received about pulleys 46 and 48 as well as the middle pulley lower pulley section 51 to operably drive all three blades 39, 40 and 41 simultaneously.

A pair of ground following rollers 60 and 61 are mounted at the rear of and depending from the housing sidewall 44. The rollers 60 and 61 help prevent ground scalping and also assist in the raising of the front of the tractor 4, as the rollers 60 and 61 allow the rear of the housing 38 to roll along the ground without digging into the ground and alternatively a drag plate may be used for this purpose. Three rollers 64, 65 and 66 are also attached to and located along the front of the housing sidewall 44.

The housing 38 has a nose section 63 that is shaped and configured to be received within the forward yoke 25, when the mower assembly 5 is in an access configuration thereof, as seen in FIG. 2. When in the access configuration, the nose 63 butts against the cross-member 30 and/or the pin 32 in a stable over center alignment such that the center of gravity of the mower housing 38 is positioned forward of the junction of the housing 38 with the yoke 25 and the housing 38 is tilted rearward from bottom to top in the access configuration to thereby, in conjunction with friction, maintain the access configuration and prevent unintended collapse.

The mounting assembly 6 functions to allow an operator to adjust the cutting height of the blades 39, 40 and 41 simultaneously, to adjust the level of the housing 38 on either side of the front and rear to position each blade 39, 40 and 41 to cut at the same height, to allow the housing 38 to adjust for uneven terrain, and to allow the frame 10 to pull rather than push the housing 38.

The mounting assembly 6 includes a pair of L-shaped members or bell cranks 68 and 69 (FIG. 3) that are pivotally connected to opposite sides of the yoke 25. Each of the L-shaped members 68 and 69 is attached near the apex thereof to the yoke 25 by pivots 70 and 71 and each have a pair of bifurcated arms 72 and 73. A similar set of L-shaped members or bell cranks 77 (FIG. 5) and 78 (FIG. 3) are connected near apexes thereof by pivot pins 79 (FIG. 5) and 80 to near the rear of the middle section 24 of the frame 10. Each of the L-shaped members 77 and 78 include a pair of bifurcated arms 83 and 84.

Referring to FIG. 1, on each side of the mower 1 arms 72 and 83 are pivotally joined by connecting links 86. Each of the arms 73 and 84 is pivotally connected to one end of a hanger 88. An opposite end of each hanger 88 is pivotally connected to the mower housing 38 respectively by front tabs 90 and rear tabs 91.

Referring to FIGS. 5 and 6, each of the hangers 88 includes a lower shaft 93 threadedly receiving an upper screw 94. Each of the screws 94 is slidingly received in a bore 95 (FIG. 8) in a pivot element 96. A lock nut 97 allows loosening of the screw 94 relative to the shaft 93 so that the screw 94 can be rotated to either lengthen or shorten the hanger 88 and then the nut 97 is retightened. In this manner each hanger 88 functions similar to a turnbuckle, and the relative height of each corner of the housing 38 may be adjusted at each of the corners thereof. The housing 38, due to gravity tends to hold the housing 38 downwardly; however, when the mower 1 crosses uneven ground, corners of the housing 38 can be urged upwardly as the associated screw 94 moves up and down in the bore 95. In addition each of the hangers 88 is pivotally mounted near the bottom and top thereof allowing substantial articulation with respect to pivoting in a front rear plane.

An operator height adjustment control arm 99 (FIGS. 1 and 2) is pivotally joined to the frame 10 at one end thereof and extends outwardly at the opposite end to be graspable by the operator. A latch plate 100 having a plurality of apertures 101 is also connected to the frame 10. The control arm 99 has a lug 102 thereon that is selectively positionable in the various apertures 101 to operably set the overall desired cutting height of the mower 1. A cross link 104 is also fixedly secured to the control arm 99. A second cross link 105 is pivotally attached near one end to the cross link 104 and near an opposite end to the L-shaped member arm 84. The L-shaped members 77 and 78 are fixedly linked by a pivot rod 107 such that both rotate in unison.

In this manner as the control arm 99 is moved by an operator, the housing 38 is raised or lowered correspondingly to set the cutting height of the mower 1.

A support plate 110 (FIGS. 1 and 7) is fixedly attached to and depends from the front of each side of the frame middle section 24. A drag link 112 pivotally attached near one end thereof to a respective support plate 110 and is disconnectably and pivotally connected near the opposite end to a respective rear tab 91 by a pin 113, also connecting the associated rear hanger 88 to the rear tabs 91. The drag link 112 operably pulls the housing 38 along as the mower frame 10 moves and as the housing 38 is supported by the hangers 88. The pin 113 is readily removed to disconnect the link 112 from the housing 38. It is foreseen that other quick connect attachments may be utilized for connecting the link 112 to the housing 38.

The placement of the support plate 110 is important as the drag link 112 must be able to rotate without binding as the housing 38 moves between a mowing configuration shown in FIG. 1 and the access configuration shown in FIG. 2.

The mower 1 includes operator directional control arms 116 that allow an operator to control both the forward and reverse movement of the rear wheels 11 independently through hydraulic transmissions 117. Turning is controlled by stopping or slowing one rear wheel 11 or 12 while operating the opposite rear wheel at a faster speed. It is foreseen that a rigid latchable strap may also be used to stabilize the mower housing 38 in the accessible configuration. Such a strap would extend between the housing 38 and the frame 10 to form a triangular configuration when latched with the housing 38 in the position of FIG. 2. Such a strap could then be unlatched to allow the housing 38 to return to the mowing configuration in FIG. 1.

The present invention is directed to a mower 1 having an underbelly mowing assembly 5 that is quickly and easily moveable between the mowing and access configurations thereof. As used herein, the term underbelly means a mower 1 having a mower assembly 5 that is mounted so the center of the mower housing 38 is under the mower frame 10 and such that the mower housing 38 does not extend extensively frontward or rearward of the frame 10, although the mower assembly 5 normally extends laterally to the sides of the mower frame 10. Normally the term "underbelly" also means that the mower housing is located between the front wheels 13 and 14 and the rear wheels 11 and 12.

In order to move from the mowing configuration to the access configuration, the foot plate 33 is first raised, and the drive belt 54 is rolled off the pulley upper section 50. The pins 113 securing the rear hangers 88 to the rear tabs 91 are removed sufficiently to disconnect the hangers 88 but leave the drag links 112 connected. Thereafter, the operator simply raises the front of the mower 1 allowing the housing 38 to rotate forward and downward at the rear thereof to the access position seen in FIG. 2 and 4. In doing so, the nose section 63 becomes positioned between the yoke arms 28 and 29 and against the cross member 30. The housing 38 in this position is preferably positioned such that the housing's center of gravity is forward of the location whereat the housing 38 engages the yoke cross-member 30, the pivot points where the front hangers 88 engage the front tabs 90 and the pivot point where the drag links 112 connect to the support plates 110. In this manner the access configuration is very stable and the operator can change blades or perform other functions on the underside of the housing 38. In the access configuration the size, shape and geometry of the nose 63 and yoke 25 prevents the housing 38 from folding over on the top thereof.

To reverse and move from the access configuration to the mowing configuration, the operator pushes with the operator's foot rearwardly on the rear of the housing 38 near the rollers 60 and 61 and simultaneously lowers the nose 63. The rear hangers 88 and main drive belt 54 are reconnected and the mower 1 is again ready for operation.

In moving from the mowing configuration to the access configuration, it is seen that the bottom of each of the drag links 112 rotate through a long arc B having a comparatively long radius while the bottom of the front hangers 88 rotate through a much shorter arc C having a comparatively much shorter radius.

It is noted that the lowermost portion of the frame rear end 21 is positioned so that when the housing 38 is moved to the access configuration that the rear end 21 does not engage the ground (FIG. 2). It is also noted that the apparatus 1 in general rotates about the axles of the rear wheels 11 when the housing is raised to the access configuration.

It is foreseen in accordance with the invention that the mower drive belt 55 could be replaced by other drive mechanisms that would still allow the housing 38 to be raised. For example, a direct drive with a telescoping drive shaft could be utilized to connect the motor to the blade pulleys.

It is also foreseen in accordance with the invention, that the mower housing may be supported on its own wheels in which case the housing would be drawn by the tractor by links, such as the illustrated links 112 or the like, in which case hangers would not be required. If the housing is self supporting, the housing would be positioned in an over center alignment when in the access configuration or a latch member between the housing and the tractor frame or chocks may be utilized about the wheels to hold the housing in the access configuration.

It is also foreseen that the mower housing could be rotated 180 degrees such that the nose is in the rear. In such an embodiment, the nose would not be received in the yoke and a latch member, chocks or the like would be required to stabilize the device in the access configuration.

It is still further foreseen that three hangers (either two front and one rear or two rear and one front) could be utilized instead of the illustrated four hangers in some embodiments.

In some embodiments it may also be desirable to have the drag links be disconnectible or that push links may be used instead of drag links in such cases a latch member, over center positioning and/or chocks may be utilized to stabilize the housing in the access configuration. Also there may be only a single drag link instead of the two shown in the illustrated embodiment. Further, the drag links limit swinging of the housing on the hangers and it is foreseen that the drag links may be eliminated if the swinging is not of concern and an alternate structure is provided to stabilize the housing in the access configuration.

While adjustable hangers are shown in the illustrated embodiment, the relative height of the mower housing corners may be preset in which case the hangers would not be adjustable.

Also, instead of the apparatus being raised to the access configuration manually, it is foreseen that a powered device or mechanical advantage device such as a hydraulic lift or jack may be used to raise the front of the tractor. Preferably, the weight of the overall apparatus is distributed such that the weight to the rear tires is almost as great as that to the front thereof to make lifting easier whether the lifting is accomplished manually or mechanically.

Second Embodiment

In FIGS. 9 and 10 the reference numeral 201 generally indicates a first modified mower that is similar in many aspects to the mower 1. Consequently, description of a substantial amount of the detail that is the same between the two embodiments is not repeated here, but rather reference is made to the first embodiment for the common detail.

The mower 201 includes a tractor 204 with a mower assembly 205 and a mounting assembly 206. The tractor includes a frame 210, rear wheels 211 and front wheels 212 with an operator seat 216 and an engine 217 that powers the tractor 204. The front wheels 212 are pivotally attached directly to the frame 210.

The mower assembly 205 is located and mounted between the front wheels 212 and rear wheels 211 by the mounting assembly 206. The mower assembly 205 has a mowing configuration, seen in FIG. 9, wherein a mower housing 238 and cutting blades (not seen) rotatably mounted in the housing 238 are generally horizontally aligned and a repair or access configuration, seen in FIG. 10, wherein the housing 238 and cutting blades are substantially vertically or rear vertically aligned to allow an operator access thereto for repairs.

The mounting assembly includes a pair of front hangers 288 that support the front of the mower assembly 205 from a height adjustment mechanism 230 having front arms 273 and rear arms 283. The rear arms 283 are removably joined to a height adjuster when in the mowing position and are each directly joined to an electrically operated linear screw 232 by a pivot pin 233. The screws 232 function as rear hangers and are manipulated to move between mowing and access configuration. The screws 232 support the rear of the mounting assembly 205. A drag link 312 is also connected to the rear of the mower assembly 205 by the pivot pin 233 and the tractor frame 210 forward of the pin 233. The drag link 312 is also pivotally joined midway to a stabilizer bar 240. The bar 240 has a slide slot 241 within which slides a pin 242 that is joined to the remainder of the mounting assembly 206. The slot 241 is L-shaped and captures the pin 242 at one end 243 of the slot 241 when in the repair or access configuration seen in FIG. 10. The bar 240 limits and stabilizes the position of the mower assembly 205 when in the repair configuration thereof (as seen in FIG. 10). A pair of drive belts 254 and 259 transfer power from the engine 217 to the mower assembly 205.

The screw 232 is electrically operated by a switch or push button 290. The screw 232 has an elongate barrel 291 and shaft 292. The end of the shaft 292 is connected to the mower assembly 206 by the pin 233 so that activation of the screw 232 to extend the shaft 292, rotates the mower housing 238 on the front hanger 288 to the raised configuration seen in FIG. 10 and retraction of the shaft 292 swings the mower housing to the mowing configuration seen in FIG. 9. It is foreseen that the screw 232 could be replaced by a manually operated screw.

Third Embodiment

Figure 12:
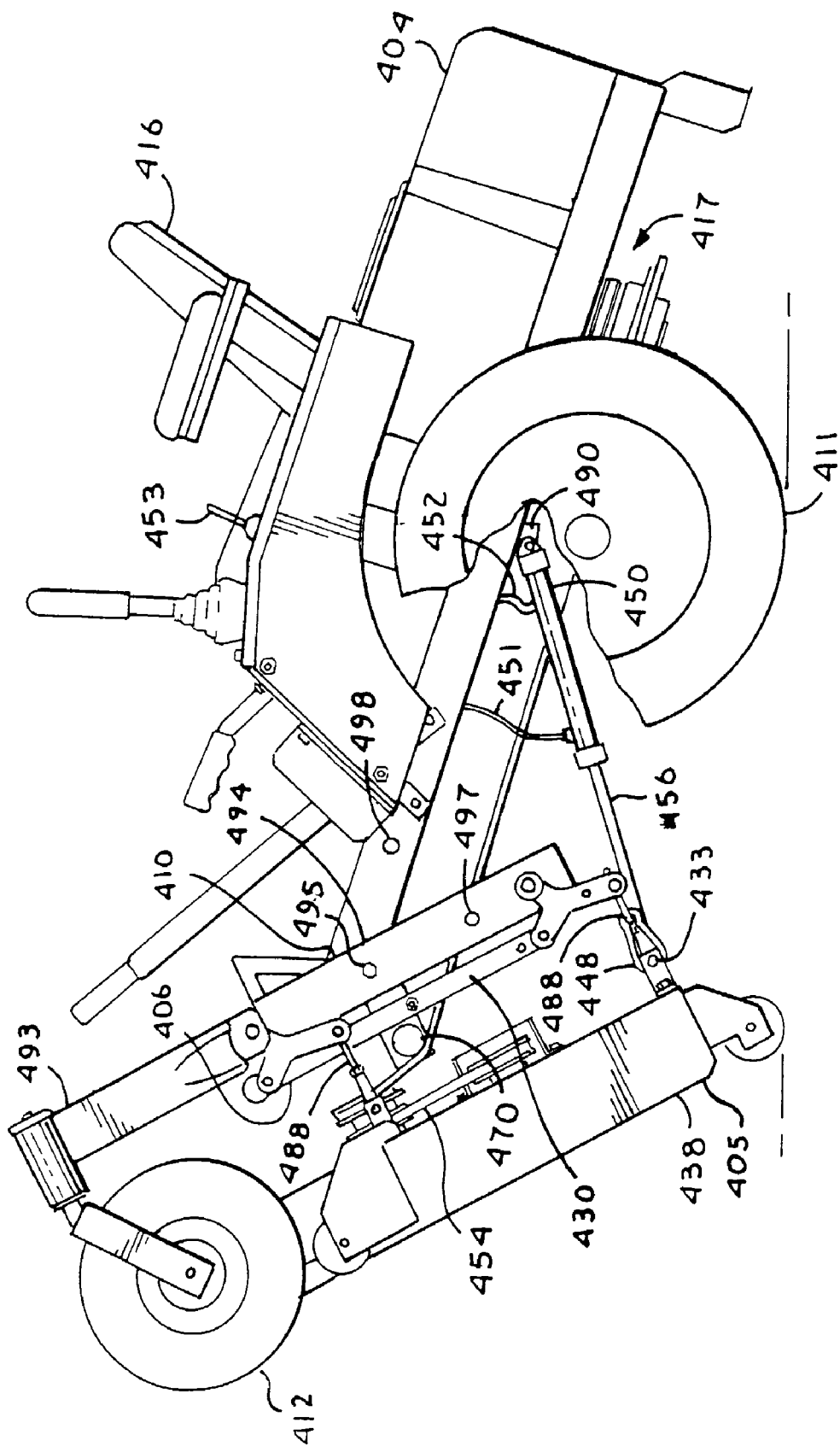
FIG. 12 is a side view of the second modified mower with the mower housing in a raised or access configuration.
Figure 13:
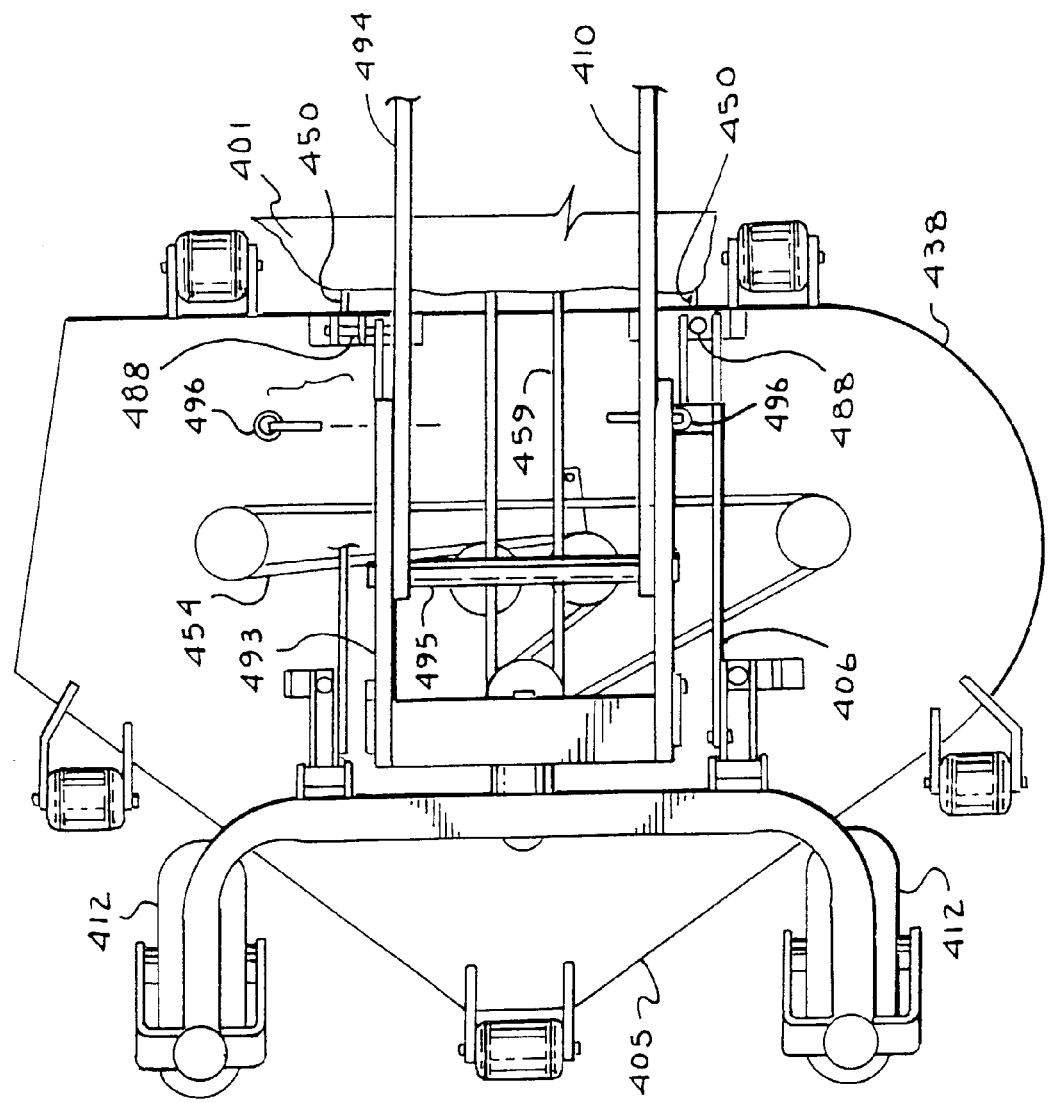
FIG. 13 is a fragmentary top plan view of the front of the second modified mower with the mower housing in the mowing configuration thereof.

In FIGS. 11, 12 and 13 the reference numeral 401 generally indicates a second modified mower that is similar in many aspects to the mower 1. Consequently, description of a substantial amount of the detail that is the same between the two embodiments is not repeated here, but rather reference is made to the first embodiment for the common detail.

The mower 401 includes a tractor 404 with a mower assembly 405 and a mounting assembly 406. The tractor 404 includes a frame 410, rear wheels 411 and front wheels 412 with an operator seat 416 and an engine 417 that powers the tractor 404.

The mower assembly 405 is mounted between the front wheels 412 and rear wheels 411 by the mounting assembly 406. The mower assembly 405 has a mowing configuration, seen in FIG. 11, wherein a housing 438 and cutting blades (not seen) are generally horizontally aligned and a repair or access configuration, seen in FIG. 12, wherein the housing 438 and cutting blades are substantially vertically or nearly vertically aligned to allow an operator access thereto for repairs.

The mounting assembly 406 includes a pair of front and a pair of rear hangers 488 that support the front and rear respectively of the mower assembly 405 from a height adjustment mechanism 430 having front arms 473 and rear arms 483. The rear arms 483 are joined by a removable clip 448 to the mower housing 438 and to a hydraulic cylinder 450 by a pivot pin 433. A pair of drive belts 454 and 459 transfer power from the engine 417 to the mower assembly 405.

A belt tensioning and retaining rod 470 when moving between the mowing and access configuration, as seen in FIG. 12 so as to tension the belt 259 which is specifically positioned and return the belt 259 so it does not require removal before raising the mower housing 438.

The hydraulic cylinder 450 is mounted by a mount 490 at one end on the frame 410 rearward of the mower assembly 405. The hydraulic cylinder 450 is operably connected to a hydraulic system of the tractor 404 having hydraulic lines 451 and 452 to provide hydraulic fluid thereto and control operation thereof under the control of a lever 453. The hydraulic cylinder 450 includes a tube 455 and a shaft 456 that reciprocates within the tube 455 under control of the hydraulic fluid. The rear hangers 488 support the rear of the mower assembly at the same location whereat the hydraulic cylinder 450 pivotally connects to the mower assembly 405 and must be disconnected prior to operation of the hydraulic cylinder 450 to swing the mower assembly 405 between configurations.

When the shaft 456 is extended, the mower housing 438 swings on the front hangers 488 to the raised or access configuration shown in FIG. 12. When the shaft 456 is retracted, the mower housing 438 swings back to the mowing configuration seen in FIG. 11.

In this embodiment the main frame 410 has a front 493 and a rear section 494 which are pivotally joined to each other by pivot rod 495. The sections 493 and 494 have a locked mowing configuration seen in FIG. 11 wherein each is held in place by locking pins 496 that is placed in receiving bores 497 and 498. When the pins 496 are removed from the bores 497 and 498, the hydraulic cylinders 450 may be selectively activated to move the mower housing 438 to the access configuration seen in FIG. 12.

Fourth Embodiment

Figure 14:
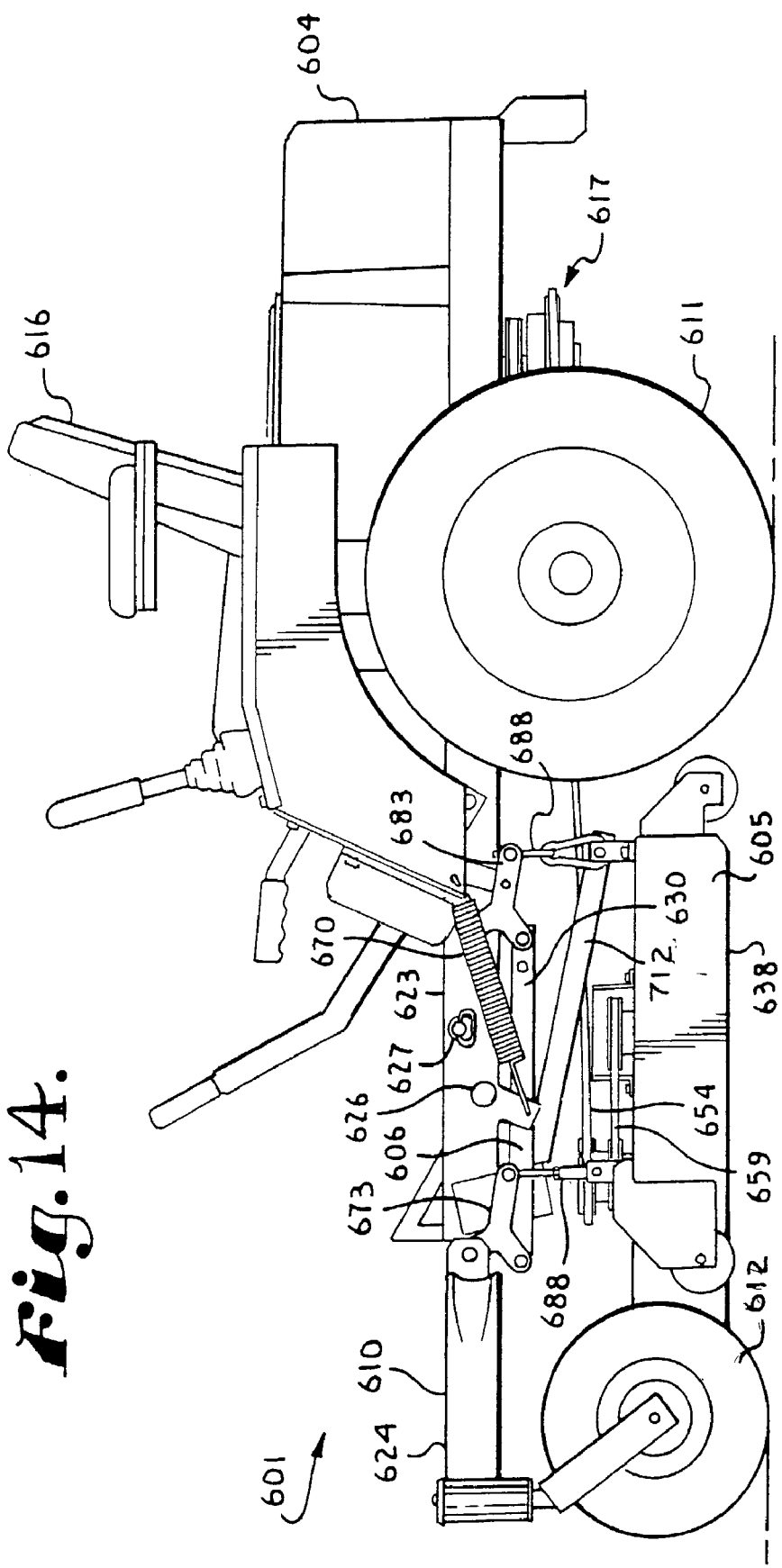
FIG. 14 is a side elevational view of a third modified mower according to the present invention with a mower housing thereof in a mowing configuration.
Figure 15:
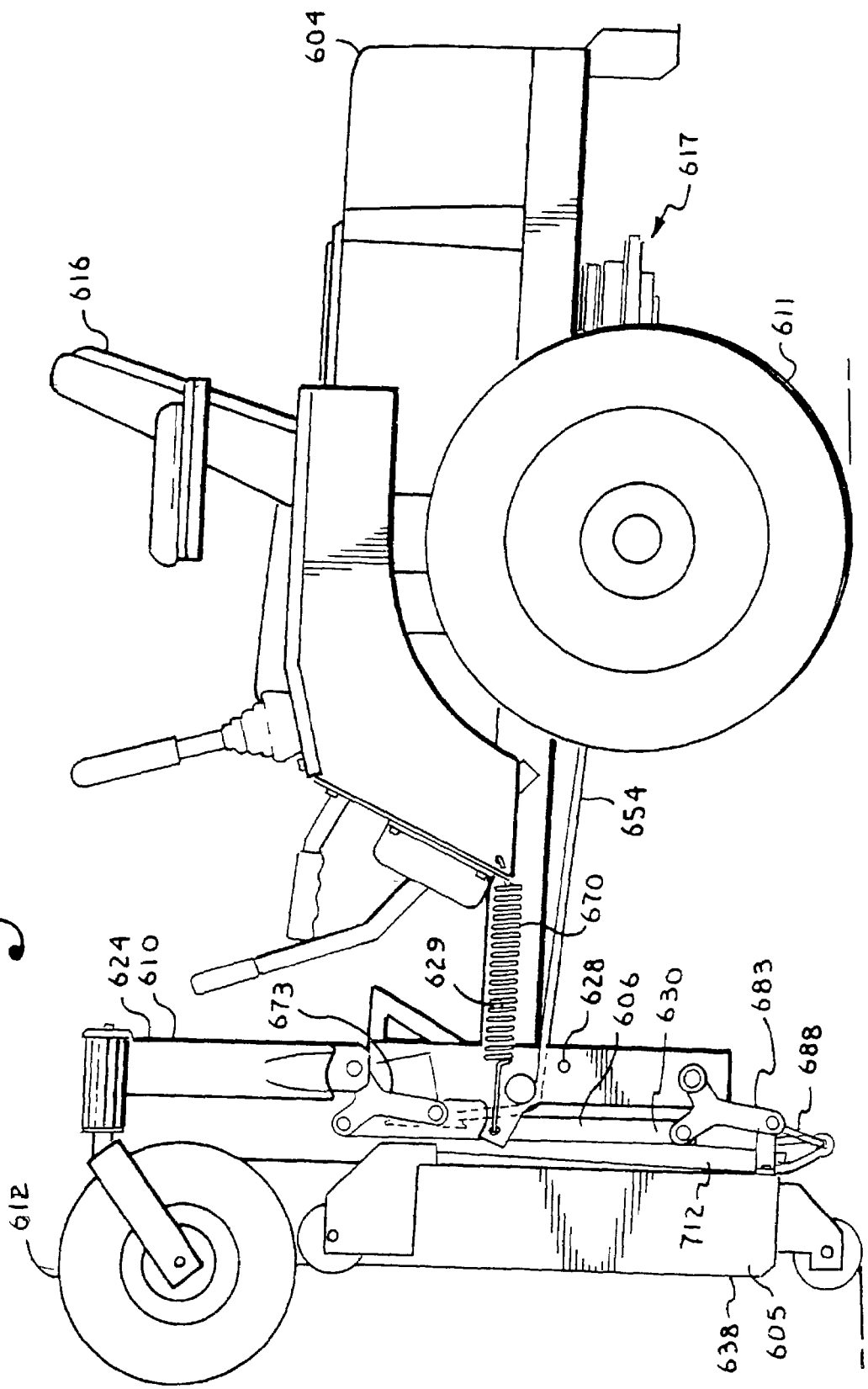
FIG. 15 is a side view of the third modified mower with the mower housing thereof in a raised configuration.

In FIGS. 14 and 15, the reference numeral 601 generally indicates a third modified mower that is similar in many aspects to the mower 1. Consequently, description of a substantial amount of the detail that is the same between the two embodiments is not repeated here, but rather reference is made to the first embodiment for the common detail.

The mower 601 includes a tractor 604 with a mower assembly 605 and a mounting assembly 606. The tractor 604 includes a frame 610, rear wheels 611 and front wheels 612 with an operator seat 616 and an engine 617 that powers the tractor 604. The frame 610 includes a rear section 623 and a forward section 624 that are pivotal by joined to each other on pivot rod 626 and which can be locked together in a mowing configuration by removeable pins 627 that are receivable in frame bores 628 and 629, as seen in FIG. 14.

The mower assembly 605 is mounted between the front wheels 612 and rear wheels 611 by the mounting assembly 606. In the mowing configuration, seen in FIG. 14, the housing 638 and cutting blades (not seen) are generally horizontally aligned or the blades rotate in a generally horizontal plane. In a repair or access configuration, seen in FIG. 15, the housing 638 and cutting blades are substantially vertically or nearly vertically aligned so as to be upright and have the blades face outwardly to allow an operator access thereto for repairs.

The mounting assembly 606 includes a pair of front and a pair of rear hangers 688 that support the front of the mower assembly 605 from a height adjustment mechanism 630 having front arms 673 and rear arms 683. A drag link 712 is also connected to the rear of the mower assembly 605 and the frame 610 forward of the rear hangers 688. A pair of drive belts 654 and 659 transfer power from the engine 617 to the mower assembly 605.

A spring 670 is joined with the frame forward section 624 and the frame rear section 625 at opposite ends thereof and spaced relationship in each case on opposite sides of the pivot rod 626. The spring 670 is an "over center" spring. The front end of the spring 670 is secured to a lever arm 671 projecting from the frame 610. In particular, when the mower assembly 605 is in the mowing configuration seen in FIG. 14, the spring 670 is below the pivot rod 626 and urges the mower frame 610 into the mowing configuration to make it easier for the operator to urge the frame 610 into this configuration and insert the locking pin 627. Likewise, when the mower assembly 605 is in the access configuration (FIG. 15), the spring 670 is above the pivot rod 626 and urges the mower assembly 605 into the access configuration and helps stabilize it there. When converting between configurations, passage of the spring 670 on either side of the rod 626, thereafter helpfully urges the mower assembly 605 to the other configuration.

Fifth Embodiment

Figure 16:
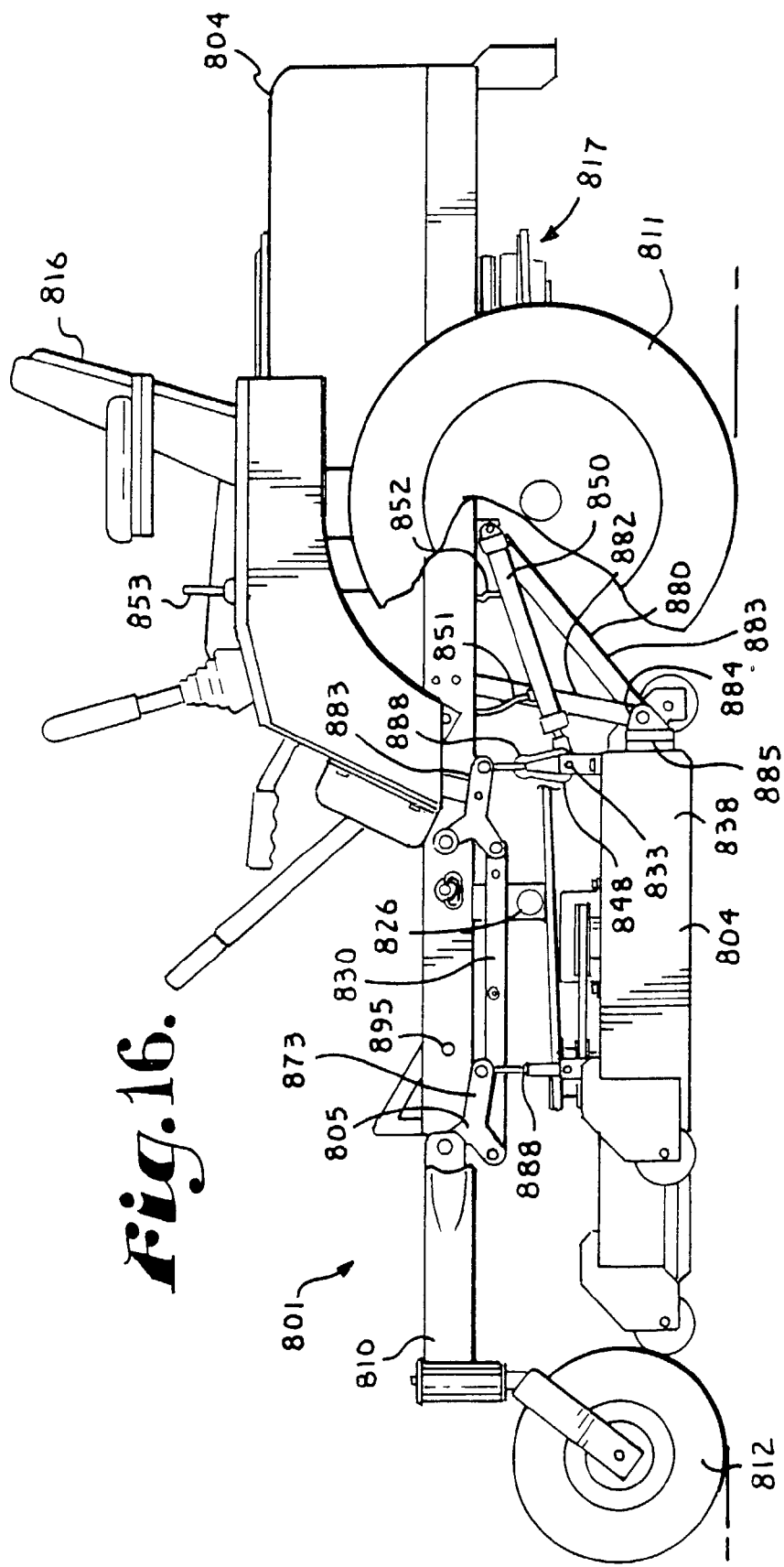
FIG. 16 is a side elevational view of a fourth modified mower according to the present invention with a mower housing thereof in a mowing configuration.
Figure 17:
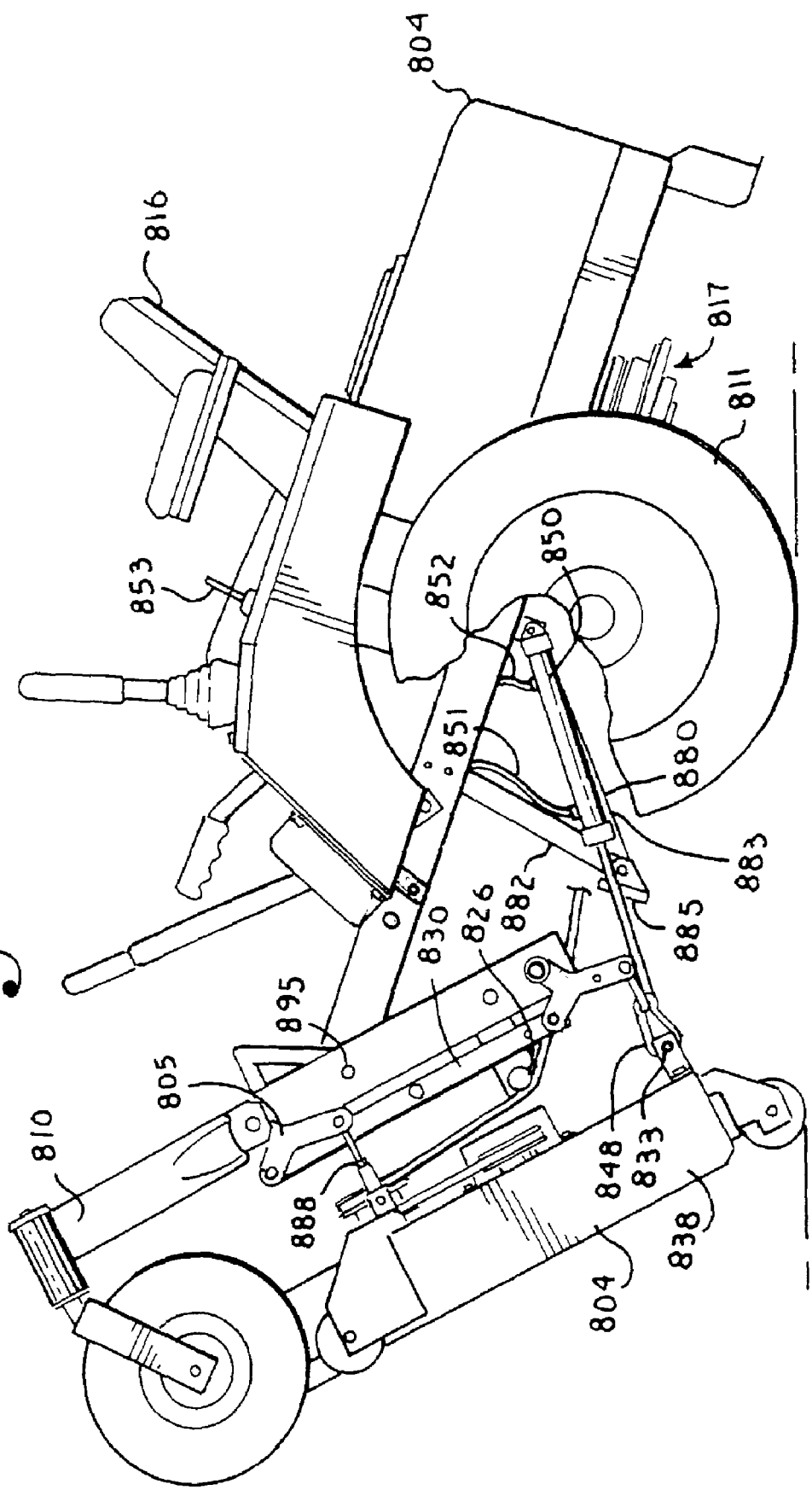
FIG. 17 is a side view of the fourth modified mower with a mower housing thereof in a raised configuration.

In FIGS. 16 and 17 the reference numeral 801 generally indicates a fourth modified mower that is similar in many aspects to the mower 1. Consequently, description of a substantial amount of the detail that is the same between the two embodiments is not repeated here, but rather reference is made to the first embodiment for the common detail.

The mower 801 includes a tractor 804 with a mower assembly 805 and a mounting assembly 806. The tractor 804 includes a frame 810, rear wheels 811 and front wheels 812 with an operator seat 816 and an engine 817 that powers the tractor 804.

The mower assembly 805 is mounted between the front wheels 812 and rear wheels 811 by the mounting assembly 806. The mower assembly 805 has a mowing configuration, seen in FIG. 16, wherein a housing 838 and cutting blades (not seen) are generally horizontally aligned and a repair or access configuration, seen in FIG. 17, wherein the housing 838 and cutting blades are substantially vertically or nearly vertically aligned to allow an operator access thereto for repairs.

The mounting assembly 806 includes a pair of front and a pair of rear hangers 888 that support the front and rear respectively of the mower assembly 805 from a height adjustment mechanism 830 having front arms 873 and rear arms 883. The rear arms 883 are joined by a removable clip 848 to a hydraulic cylinder 850 by a pivot pin 833. A pair of drive belts 854 and 859 transfer power from the engine 817 to the mower assembly 805. A tensioning and retention rod 826 is suspended from the frame 810 and function in the same way as described for rod 626 or the previous embodiment.

The hydraulic cylinder 850 is mounted at one end on the frame 810 rearward of the mower assembly 805. The hydraulic cylinder 850 is operably connected to a hydraulic system by hydraulic lines 851 and 852 of the tractor 804 to provide hydraulic fluid thereto and control operation thereof under the control of lever 853. The hydraulic cylinder 850 includes a tube 855 and an extendable shaft 856 that reciprocates within the tube 855 under control of the hydraulic fluid. The rear hangers 888 support the rear of the mower assembly at the same location whereat the hydraulic cylinder 850 pivotally connects to the mower assembly 805 and must be disconnected prior to operation of the hydraulic cylinder 850 to swing the mower assembly 805 about a pivot 895 between configurations thereof.

The mower 801 mainly differs from the mower 400 in that it does not include drag links, but rather has a rear pusher 880 that pushes the mower housing 838 forward. The pusher 880 includes a pair of braces 882 and 883 joined in a V-shaped pattern to the tractor frame 810. At a juncture 884 of the braces 882 and 883 is a pusher pad 885 that operably abuts, but is not joined to, the mower assembly 805 for urging the mower assembly 805 forward.

It is to be understood that while certain forms of the present invention have been illustrated and described herein, it is not to be limited to the specific forms or arrangement of parts described and shown.

The invention claimed is:

1. A self-propelled mower comprising:
   a) a tractor adapted to traverse ground; said tractor having a frame and at least one front wheel and at least one rear wheel mounted on said frame with said frame extending between said front and rear wheels;
   b) a mower assembly independent of said front and rear wheels and having a mower housing underbelly mounted relative to said frame such that from front to rear said mower assembly is mainly located between and is independent of said front and rear wheels during operation; and
   c) a mounting assembly connecting said housing to said frame; said mounting assembly including a forward pivot connecting said mower assembly to said frame and a disconnectable rearward hanger that connects a rear of said housing to said frame; said rearward hanger allowing said mower housing to move vertically to adjust cutting height of said mower housing while securing said housing in a mowing configuration during normal mowing operation; said rear hanger being selectively disconnectable to enable a rear of said housing to swing on said forward pivot downward and forward compared to a front of said housing so as to be moveable from said mowing configuration to a generally upright access configuration wherein an underside of said housing is available to a user, subsequent to said rear hanger being disconnected.

2. The mower according to claim 1 wherein:
a) said front wheel is a first front wheel and including a second front wheel; and including
b) a cross member connected near opposite ends thereof to said first and second front wheels; said cross member being centrally pivotally connected to said frame so as to allow side to side pivoting of said front wheels about an axis extending from front to rear of the mower; said cross member being sized and positioned to allow said housing to move to the access configuration thereof.

3. A self propelled mower including:
a) a frame mounted on front and rear ground traversing wheels; said frame being medially selectively pivotal between a front portion and a rear portion thereof;
b) an underbelly mower housing located substantially between and being independent of said front and rear wheels and operably positioned during mowing beneath said frame;
c) a mounting assembly mounting said mower housing on said frame;
d) a mechanized drive connected to said frame and to near a rear of said mower housing to operably rotate said mower housing between a mowing configuration and a raised accessible configuration thereof;
e) a motor;
f) said mower being operably driven through a drive belt by said motor; and
g) a tensioning and retention rod secured to said frame and positioned so as to engage said drive belt when said mower housing is moved from said mowing configuration to said accessible configuration so as to retain said belt on said mower during conversion between configurations.

4. A self propelled mower including:
a) a frame mounted on front and rear ground traversing wheels;
b) an underbelly mower housing located substantially between and being independent of said front and rear wheels and operably positioned during mowing beneath said frame;
c) a mounting assembly mounting said mower housing on said frame;
d) said frame includes a frontward portion and a rearward portion with at least part of said mower housing being supported by said frame frontward portion;
e) said frame frontward portion being joined to said frame rearward portion at a pivot located between said front and rear wheels and allowing a front of said frontward portion to be pivoted so as to raise said mower housing from a mowing configuration to a blade accessible configuration thereof;
f) an over center spring type mechanism joined at opposite ends to said frame frontward and rearward portions; and
g) said spring type mechanism applying continuous tension and being sized and positioned such that said spring type mechanism is located above said pivot when in said accessible configuration and below said pivot when in said mowing configuration so as to urge the mower housing into the respective configurations thereof at least partly during movement between configurations.

* * * * *